United States Patent
Mosier et al.

(10) Patent No.: US 12,183,472 B2
(45) Date of Patent: Dec. 31, 2024

(54) SYSTEMS AND METHODS FOR STEAM SEPARATOR TIE BAR REPAIR OR REPLACEMENT

(71) Applicant: GE-Hitachi Nuclear Energy Americas LLC, Wilmington, NC (US)

(72) Inventors: Sean T. Mosier, Wilmington, NC (US); Mark D. Sumner, Wilmington, NC (US); Harold C. Lowe, Charlotte, NC (US); Samuel T. Kratt, Crestwood, KY (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1595 days.

(21) Appl. No.: 16/011,574

(22) Filed: Jun. 18, 2018

(65) Prior Publication Data
US 2019/0385755 A1    Dec. 19, 2019

(51) Int. Cl.
*G21C 19/20*    (2006.01)
*F16L 39/00*    (2006.01)
(Continued)

(52) U.S. Cl.
CPC ............ *G21C 19/207* (2013.01); *F16L 39/00* (2013.01); *F22B 37/007* (2013.01);
(Continued)

(58) Field of Classification Search
CPC ...... F22B 37/007; F22B 37/26; F22B 37/205; G21C 1/084; G21C 15/22; G21C 19/207;
(Continued)

(56) References Cited

U.S. PATENT DOCUMENTS

| | | | | |
|---|---|---|---|---|
| 629,690 A | * | 7/1899 | Huberdeau | F16L 41/084 285/201 |
| 3,004,781 A | * | 10/1961 | Morris | F16L 21/08 285/369 |

(Continued)

FOREIGN PATENT DOCUMENTS

| | | |
|---|---|---|
| JP | 2002372016 | 12/2002 |
| JP | 2011191080 | 9/2011 |
| JP | 2016151492 | 8/2016 |

OTHER PUBLICATIONS

"General Electric Systems Technology Manual," Dec. 14, 2014, Chapter 2.1.
(Continued)

*Primary Examiner* — Gregory A Wilson
*Assistant Examiner* — Andrew W Cheung
(74) *Attorney, Agent, or Firm* — Alley IP

(57) ABSTRACT

Systems enhance stand pipe alignment and security with braces docking to the stand pipes. A link connects pairs of braces so the braces and stand pipes docked thereby cannot move relative to each other when fully secured. Partially securing braces allows adjustment of the braces and distance between the same and thus stand pipe position. Fully securing the braces makes the entire system rigid without need for a tie bar. Braces and links can be installed and secured to the stand pipes and among each other at an axial position from above the stand pipes, so that overhead, simple tooling may be used. A crimp nut or other resilient connector may be used to secure the systems from that single dimension with simple tooling. Any number of braces, joining to any number of other braces, may be used in the system, and several systems may be used at various levels.

19 Claims, 6 Drawing Sheets

(51) Int. Cl.

| | |
|---|---|
| *F22B 37/00* | (2006.01) |
| *F22B 37/20* | (2006.01) |
| *F22B 37/26* | (2006.01) |
| *F28F 9/013* | (2006.01) |
| *G21C 1/08* | (2006.01) |
| *G21C 15/22* | (2006.01) |
| *F16L 21/08* | (2006.01) |

(52) U.S. Cl.
CPC ............ *F22B 37/205* (2013.01); *F22B 37/26* (2013.01); *F28F 9/0132* (2013.01); *G21C 1/084* (2013.01); *G21C 15/22* (2013.01); *F16L 21/08* (2013.01); *F22B 37/202* (2013.01); *Y10T 29/49373* (2015.01)

(58) Field of Classification Search
CPC ............ E21B 19/16; E04D 2013/0846; F16L 3/1222; F16L 23/032; F16L 3/237; F16L 3/22; F01N 13/1805; F28F 9/0132; E01B 2201/08; Y10T 29/49824; F16F 7/126; Y02E 30/30; F24H 9/12
USPC .............. 122/510, 512, 511, 493; 285/124.1, 285/125.1, 136.1, 414, 416, 406, 421; 403/211; 29/890.031
See application file for complete search history.

(56) References Cited

U.S. PATENT DOCUMENTS

| | | | | |
|---|---|---|---|---|
| 3,116,407 | A * | 12/1963 | Murtha | F22B 37/205 219/59.1 |
| 3,221,589 | A * | 12/1965 | Vander Sande | F16B 5/0208 411/49 |
| 4,627,774 | A * | 12/1986 | Bradley | F16B 31/021 411/410 |
| 4,660,862 | A * | 4/1987 | Cassel | F01N 13/1805 285/114 |
| 5,136,985 | A * | 8/1992 | Krowech | F22B 37/202 122/510 |
| 5,174,371 | A * | 12/1992 | Grillo | F28F 1/22 165/171 |
| 5,692,557 | A * | 12/1997 | Gillet | F28F 9/0132 165/69 |
| 5,918,912 | A * | 7/1999 | Keifel | F01N 13/1811 285/124.1 |
| 6,236,700 | B1 * | 5/2001 | Erbes | G21C 15/12 376/260 |
| 6,273,030 | B1 * | 8/2001 | Harth, III | F22B 37/202 110/325 |
| 6,322,273 | B1 * | 11/2001 | Gentile, Jr. | F16L 25/065 403/2 |
| 8,964,929 | B2 * | 2/2015 | Sprague | G21C 15/25 376/372 |
| 10,118,745 | B1 * | 11/2018 | Schmidt | B65D 88/00 |
| 2003/0106968 | A1 * | 6/2003 | Terrill | F16L 21/04 248/58 |
| 2004/0179979 | A1 * | 9/2004 | Higbee | F28F 9/0132 422/129 |
| 2006/0207096 | A1 * | 9/2006 | Gandy | B23P 6/00 29/890.031 |
| 2009/0315390 | A1 * | 12/2009 | Weld | B60B 3/10 301/37.376 |
| 2010/0242279 | A1 * | 9/2010 | Sprague | G21C 19/207 29/888.021 |
| 2011/0291409 | A1 * | 12/2011 | Kennedy, Jr. | F16L 25/065 285/421 |
| 2013/0174627 | A1 | 7/2013 | Aoki et al. | |
| 2015/0136044 | A1 * | 5/2015 | Palmer | F22B 15/00 122/235.11 |
| 2016/0305650 | A1 * | 10/2016 | Magee | F22B 1/1815 |
| 2017/0321726 | A1 | 11/2017 | Lane et al. | |

OTHER PUBLICATIONS

WIPO, International Search Report in Corresponding PCT Application PCT/US2019/046082, Mar. 13, 2020.
WIPO, Written Opinion in Corresponding PCT Application PCT/US2019/046082, Mar. 13, 2020.
Spanish Office of Patents and Trademarks, Report on the State of the Art in Corresponding ES Application 202090064, Mar. 2, 2021.

* cited by examiner

SYSTEMS AND METHODS FOR STEAM SEPARATOR TIE BAR REPAIR OR REPLACEMENT

BACKGROUND

As shown in FIG. 1, a nuclear reactor, such as a Boiling Water Reactor (BWR), includes a reactor vessel 12 housing a nuclear fuel core 36 that generates power through nuclear fission. Reactor vessel 12 may be of a generally cylindrical shape, closed at a lower end by bottom head 28 and at a top end by removable top head 29. A cylindrically-shaped core shroud 34 may surround reactor core 36, which includes several nuclear fuel elements or assemblies. Shroud 34 may be supported at one end by shroud support 38 and may include removable shroud head 39 and separator tube assembly at the other end. One or more control blades 20 or other control elements may extend upwards into core 36, so as to control the fission chain reaction within fuel elements of core 36. Additionally, one or more instrumentation tubes 50 may extend into reactor core 36 from outside vessel 12, such as through bottom head 28, permitting instrumentation, such as neutron monitors and thermocouples, to be inserted into and enclosed within the core 36 from an external position.

Fuel bundles may be aligned and supported by fuel support castings 48 located on a core plate 49 at the base of core 36. Castings 48 may receive individual fuel bundles or groups of bundles and permit coolant flow through the same. Fuel support castings 48 may further permit instrumentation tubes 50, control blades 20, and/or other components to pass into core 36 through or between fuel supports 48. A fluid, such as light or heavy water, is circulated up through core plate 49 and core 36, and in a BWR, is at least partially converted to steam by the heat generated by fission in the fuel elements. The steam is separated and dried in steam separator tube assembly 14 and steam dryer structures 15 and exits vessel 12 through a main steam line 3 near a top of vessel 12. Other fluid coolants and/or moderators may be used in other reactor designs, with or without phase change.

FIG. 2 is a cross sectional schematic detail view of vessel 12 taken at an axial level of steam separator tube assembly 14. As seen in FIG. 2, several steam separator tubes or stand pipes 41 axially extend in vessel 12 so that steam exiting the core may flow through stand pipes 41 with varying diameters and/or swirl vanes that remove liquid coolant entrained in the steam. Stand pipes 41 may be horizontally aligned to fill the available space; for example, as shown in FIG. 2, stand pipes 41 may be arrayed in a 60-degree lattice. One or more tie bars 42 may pass along several stand pipes 41, to which they may be rigidly joined, such as by welding. Tie bars 42 align several stand pipes 41 along a given line, such that each stand pipe 41 may be braced by three different tie bars 42 in the related art of FIG. 2. Tie bars 42 thus prevent any one stand pipe 41 from tilting or translating out of alignment with others along the tie bar's line. Multiple tie bars 42 may be used at different elevations, ensuring alignment throughout an axial dimension of stand pipes 41. Co-owned "General Electric Systems Technology Manual," Dec. 14, 2014, Chapter 2.1, describes helpful technological context and are incorporated by reference herein in their entireties.

SUMMARY

Example embodiments include systems useable with separator assemblies to repair, replace, or work with stand pipes alignment structures therein. Example systems use several braces that bias against or clamp to the stand pipes to secure to the same. The braces may partially or completely surround the pipes and be a same size, such as a circular or ellipsoidal shape that matches an exterior surface of the stand pipes. A linking strut connected between any two braces ensures no relative movement of the braces or stand pipes therein. The linking strut and braces may mate in a configuration that permits some adjustment of the braces when joined and then permits no further adjustment when fully secured, permitting distances and orientations among braces to be adjusted during installation. All clamping, biasing, and/or securing of the braces to the stand pipes and linking struts among the braces can be executed from a single direction, or at a single interface plane, such as axially above example systems, enabling simpler tooling for installation. Any selective, retainable connector may be used for this, including crimp nuts, locks, ratchets, one-way screws or nuts, latches, etc.

Example methods may install the system by axially lowering the braces around the stand pipes and clamping or biasing the braces to achieve a rigid connection with no relative movement between the two. If a tie bar is removed first, a remaining piece on the stand pipe of the tie bar may present as a shelf or stopping point for lowering the braces. The linking strut may then be installed to connect the braces by connecting pairs of braces. The braces may be rigidly secured at any point, including following installation of the linking strut and adjustment by rotation of the brace(s) to achieve a desired distance and thus alignment between the braces and stand pipes braced thereby. All braces and linking bars may be secured from above, such as through top nuts that drive the securing among all components. Multiple sets of braces and example embodiment systems may be used as varying axial heights and across multiple combinations of stand pipes.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
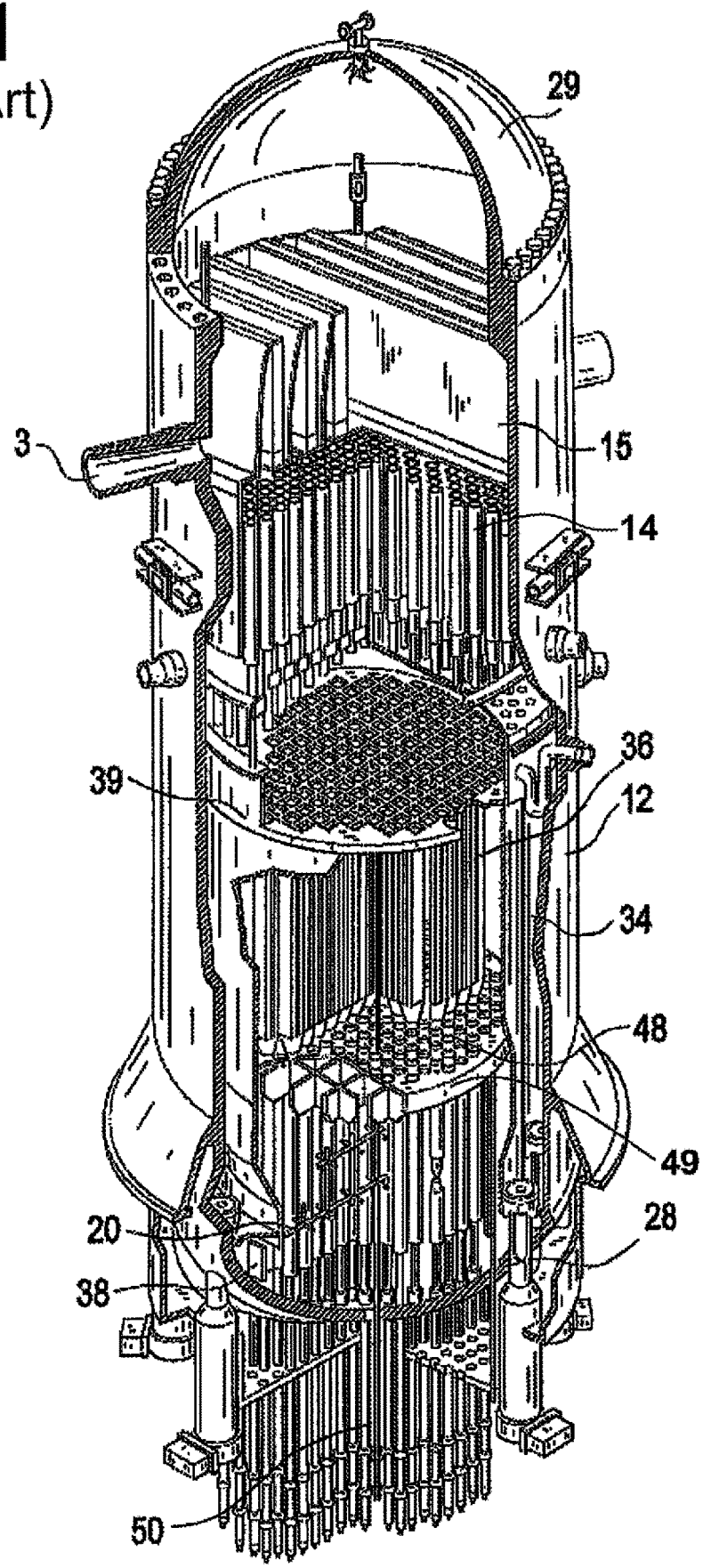
FIG. 1 is an illustration of a related art nuclear power vessel and internals.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, "axial" and "vertical" directions are the same up or down directions oriented along the major axis of a nuclear reactor, often in a direction oriented with gravity. "Transverse" directions are perpendicular to the "axial" and are side-to-side directions oriented in a single plane at a particular axial height.

Figure 2:
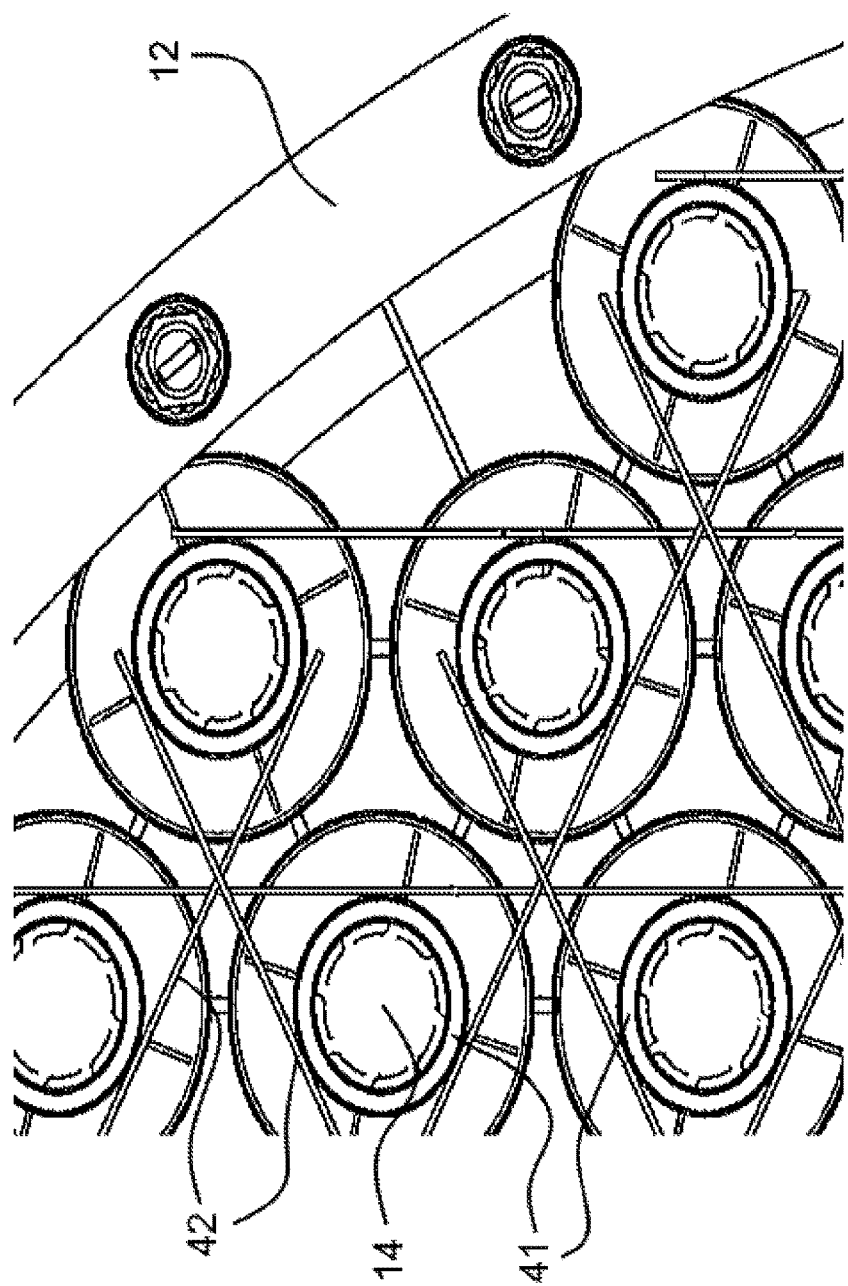
FIG. 2 is a schematic detail illustrations of a related art steam separator assembly.

The Inventors have recognized that tie bars 42 (FIG. 2) can become bent or warped during operation and/or maintenance of a nuclear reactor. Improper handling of reactor structures during installation or outages, such as impact with a handling crane or other equipment to separator assembly 14 (FIG. 2), as well as improper installation or extreme vibration during operation may damage tie bars 42. Stand pipes 41 (FIG. 2) in turn can become misaligned axially and transversely, causing them to interfere with other stand pipes 41 and/or not receive and separate out liquid from a boiled coolant. Repairing damaged tie rods 41 requires complex tooling and/or submerged welding to reach when installed in the reactor, which may represent a large cost and delay during a maintenance outage or even requiring plant shutdown. Repaired portions of tie bars 42 may become loose and free-flowing in coolant, causing damage to primary coolant loop equipment or even fuel due to secondary impacts. Example embodiments and methods described below address these and other problems recognized by Inventors with unique solutions enabled by example embodiments.

The present invention is separator assembly supplementation systems and methods of installing and using the same. In contrast to the present invention, the few example embodiments and example methods discussed below illustrate just a subset of the variety of different configurations that can be used as and/or in connection with the present invention.

Figure 3:
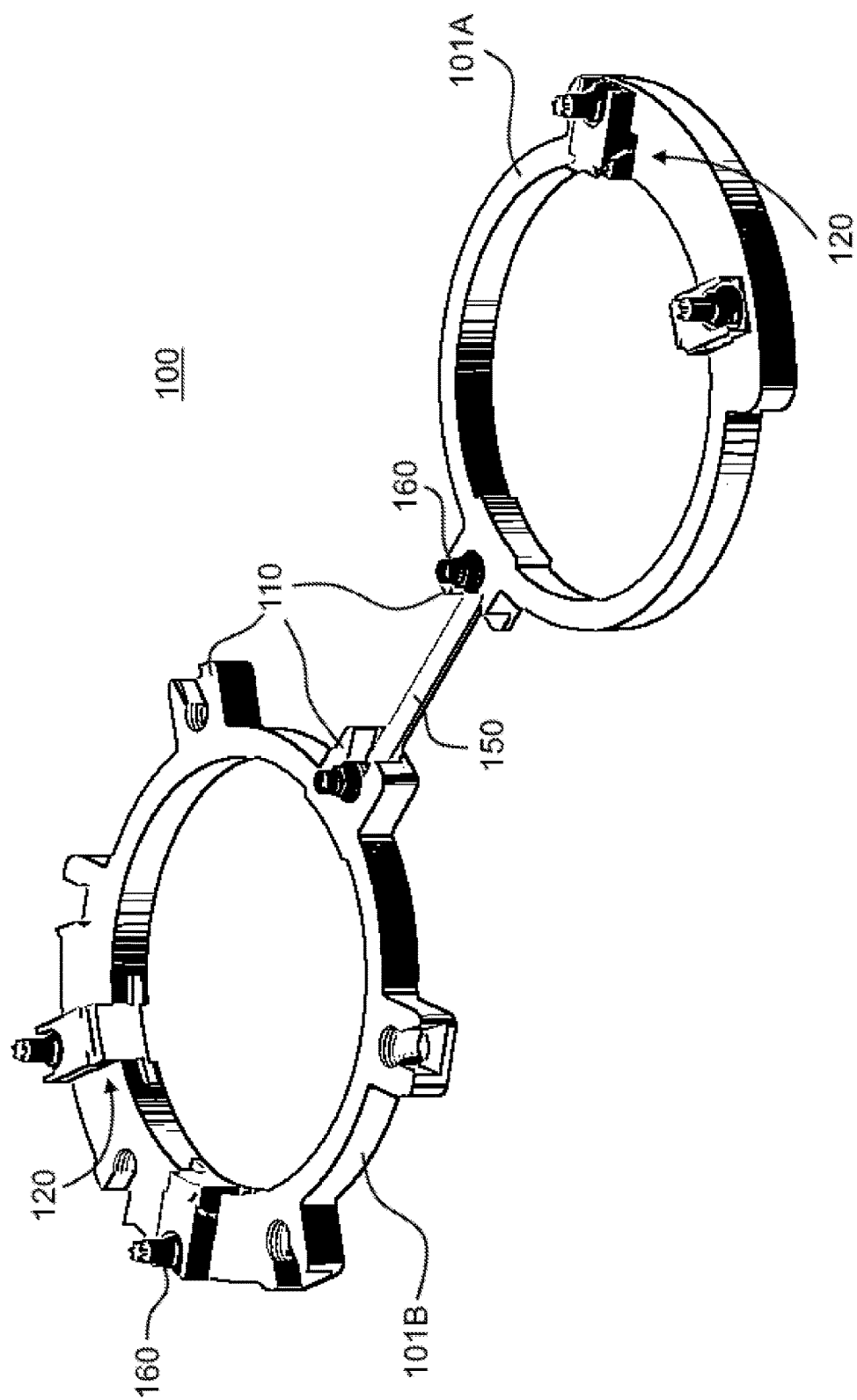
FIG. 3 is an illustration of an example embodiment tie bar replacement or repair system.

FIG. 3 is an illustration of an example embodiment tie bar replacement or repair system 100. As shown in FIG. 3, example embodiment system 100 includes a first separator stand pipe brace 101A and second separator stand pipe brace 101B joined by a link bar 150. Braces 101A and 101E are shaped to fit around stand pipes 41 (FIGS. 2, 6), and, when tightened, seat to and/or press against an outer perimeter of stand pipes 41. Braces 101A and 101E may be circular with a diameter of several inches to several feet, ellipsoid, or any other shape to so match a perimeter, or a portion of a perimeter, of the stand pipes. Braces 101A and 101E may fit axially over stand pipes in a separator assembly without any disassembly, welding, or complicated tooling—only access to a vertical end of a stand pipe may be required for installation. One or more securing devices, such as biasing hubs 120, described further in FIG. 5, may allow braces 101A and 101E to adjustably secure to stand pipe perimeters without further movement.

Example embodiment system 100 may include same or different types of stand pipe braces 101A and 101B. For example, FIG. 3 illustrates a simplified brace 101A having a single connection hub 110 joined to a multi-directional brace 101E having multiple connection hubs 110. Of course, same types of braces 101 could be used through example system 100, or any number of different types of braces 101. Braces 101A and 101E are joined by link bar 150 mating with their respective connection hubs 110. In this way, braces 101A and 101E may join to and brace adjacent stand pipes. Similarly, multiple other braces could be joined to brace 101E through other connection hubs 110, securing any number of and relationship among stand pipes in a separator assembly. Additional details of connection hub 110 and biasing hub 120 useable in braces are discussed below in connection with FIGS. 4 and 5, respectively.

Figure 4:
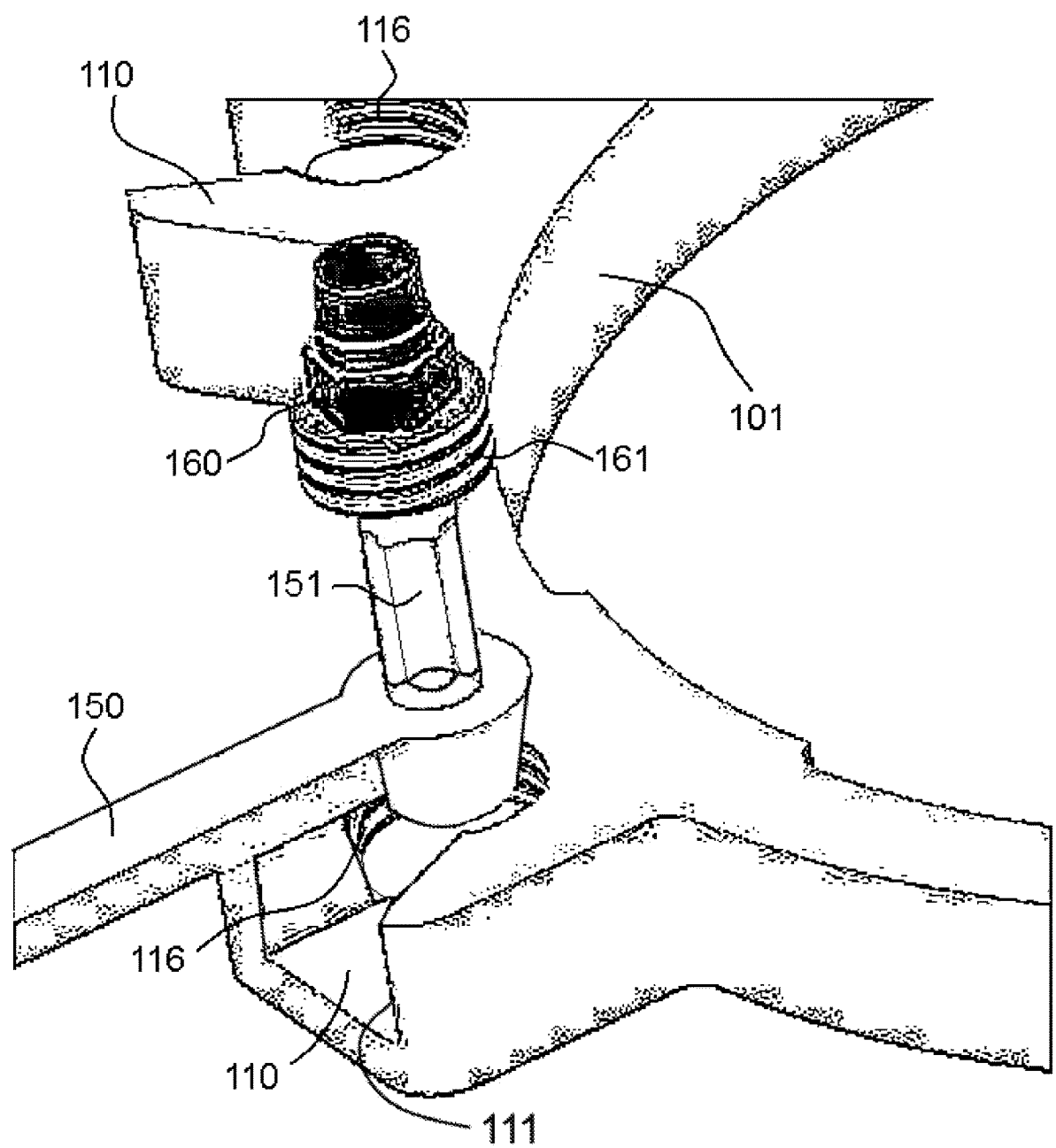
FIG. 4 is a detail illustration of a connection hub useable in the system of FIG. 3.

FIG. 4 is a detail view of connection hub 110 that may be formed from or attached to brace 101 in an example embodiment. As shown in FIG. 4, hub 110 is shaped to receive and secure, in one or more dimensions and/or axes of rotation, an end of link bar 150. In the example of FIG. 4, connection hub 110 includes a dove-tailed wedge 111 with a conical central bore or hole that matches an end of link bar 150. In this way, link bar 150 may axially seat into wedge 111 while having some permitted degree of rotation about the axial direction to the edges of wedge 111. When link bar 150 is so captured and free to rotate, wedge 111 defines a certain degree of rotational freedom of link bar 150 and thus transverse distance among braces 101 joined thereby. Of course, wedge 111 may be narrower so as to permit no movement of link bar 150, or wider or missing altogether to permit greater rotational freedom of link bar 150.

Link bar 150 may be secured in connection hub 110 by crimp nut 160 that passes around crimp post 151 on link bar 150. Threads 161 on crimp nut 160 match threaded surface 116 lining the hole or bore of wedge 111, such that crimp nut 160 may be tightened vertically down onto link bar 150. Once link bar 150 has been seated in wedge 111 and crimp nut 160 rotated down to mesh threads 161 with threaded surface 116, link bar 150 may not be removable from brace 101, while potentially retaining some degree of movement, such as rotation in wedge 111. Further rotation and tightening of crimp nut 160 may eliminate this degree of freedom due to friction. To lock crimp nut 160 in place, it may be deformed, or crimped, against crimp post 151, which prevents further rotation. Of course, other joining devices, including ratchets, tang-and-bore, locks, etc. may be used in connection hub 110 to retain link bar 150 therein with desired levels of freedom of movement.

Any number of connection hubs 116 may be used in brace 110. For example, up to six connection hubs 110 may be spaced at 60-degree intervals to connect to six link bars and other braces. Or a single connection hub 110 may be used. In this way, brace 110 may join to any number of desired other braces to stabilize any number of stand pipes in a separator assembly.

Figure 5:
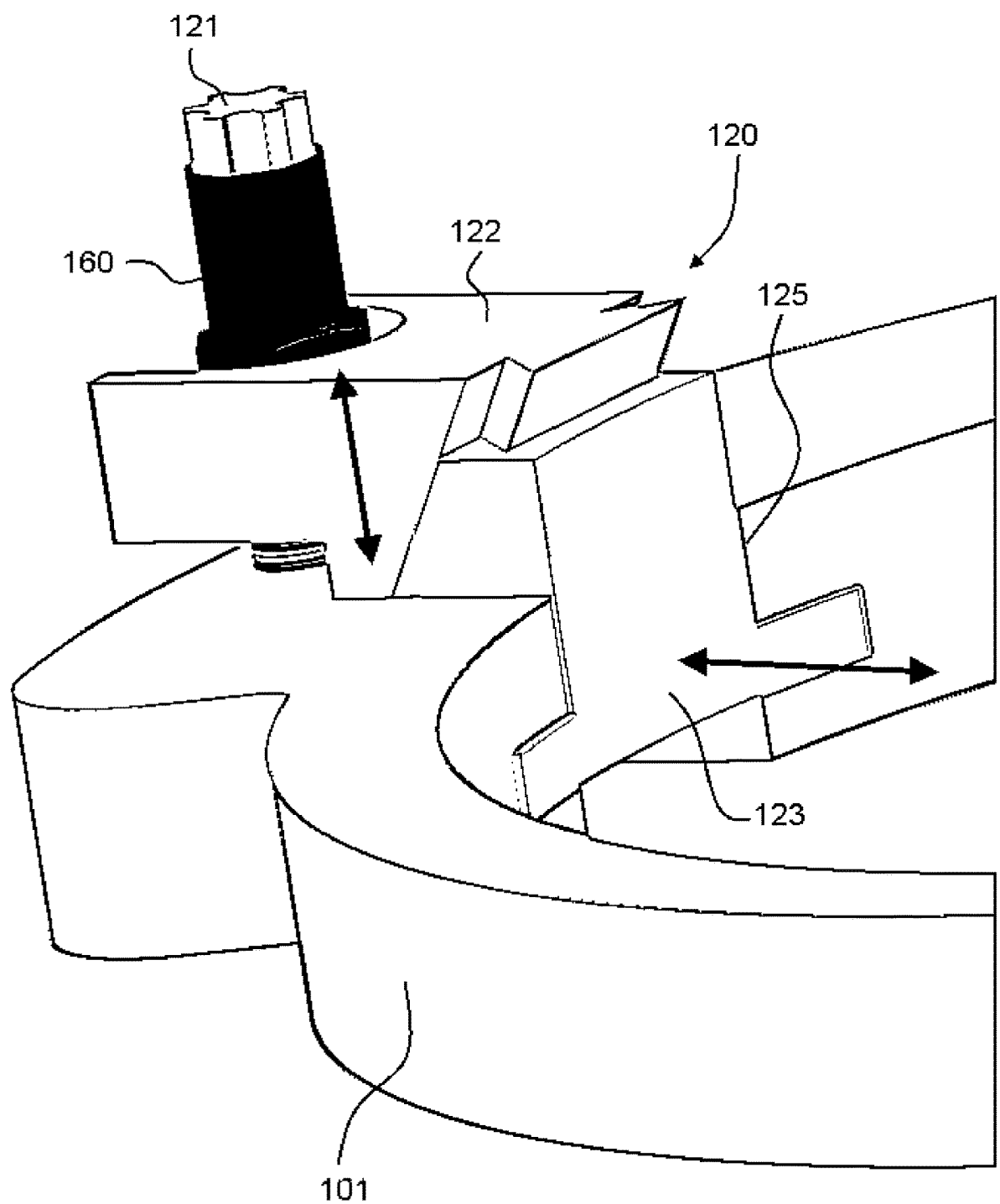
FIG. 5 is a detail illustration of a biasing hub useable in the system of FIG. 3.

FIG. 5 is a detail view of a biasing hub 120 that may be formed from or attached to brace 101 in an example embodiment. As seen in FIG. 5, biasing hub 120 includes driving wedge 122 and biasing wedge 123 slidably interlocked in recess 125 in brace 101. Because of the angled sliding interface between driving wedge 122 and biasing wedge 123, as driving wedge 122 moves vertically downward, biasing wedge 123 is forced transversely into a center of brace 101. Similarly, as driving wedge 122 is withdrawn upward, biasing wedge 123 withdraws transversely. Given this relationship, biasing wedge 123 may be driven against a surface of a stand pipe inside of brace 101 to close any gap between brace 101 and the stand pipe, and/or with a desired level of force to clamp and prevent more relative movement between brace 101 and the stand pipe.

Driving wedge 122 may be connected to brace 101 by passing around drive post 121; that is, driving wedge 122 may be only axially moveable when drive post 121 passes through driving wedge 122 and into recess 125. Drive post 121 may include a threaded surface and a crimping surface, similar to crimp post 151 (FIG. 4).

Crimp nut 160 may similarly drive down driving wedge 122 by meshing internal threads on the threaded surface of drive post 121, essentially the reverse thread surfaces of crimp post 151. When tightened to a desired position and/or force, which is translated to transverse positioning and/or force in biasing wedge 123, crimp nut 160 may be deformed against crimp post 151 to preserve its position and/or bias. Of course, other keeping devices, including one-way screws, ratchets, locks, etc. may be used in biasing hub 120 to retain wedge 122 in a desired position and/or bias.

Any number of biasing hubs 120 can be used in a single brace 101, depending on desired positioning and force profiles. For example, a single biasing hub 120 may be adequate to lock brace 101 with a stand pipe, or four biasing hubs 120 may be used at 90-degree angles about brace 101 for balanced 2-dimensional positioning and biasing. Biasing wedge 123 and/or brace 101 may include a seal, evening or shielding surface, or interposed layer at any interior position facing the stand pipe, such as an elastic, deformable, or barrier material that improves seating, sealing, and/or damage reduction with a stand pipe.

Because biasing hubs 120 permit fitting to multiple-sized stand pipes, braces 101 may not require customized sizing or fitting, and can be manufactured in a single size to work with several different stand pipe geometries. Similar to connection hub 110, biasing hub 120 may be interfaced with and operated from above, or at a single plane along with all other operative elements of example system 100, including connection hub 110, other braces 101, and ends of stand pipes, which may require less tooling or complicated interactions.

Figure 6:
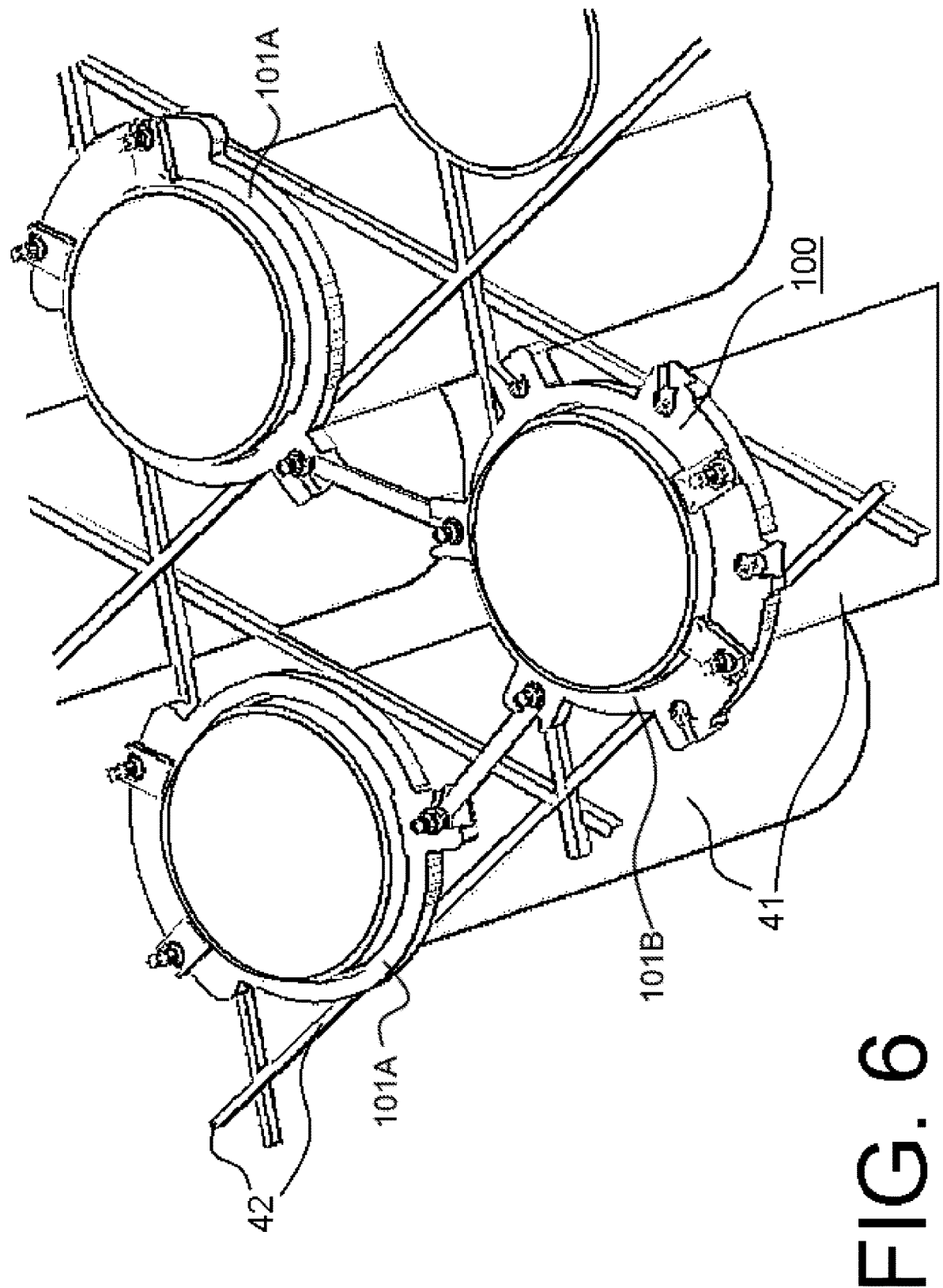
FIG. 6 is a perspective view an example embodiment tie bar replacement or repair system as installed on a steam separator assembly.

FIG. 6 is an illustration of example embodiment tie bar replacement or repair system 100 as installed among several stand pipes 41. In an example method of installation, damaged or unwanted tie bars 42 may be removed or cut down to smaller pieces where they are welded or joined to stand pipes 41. These remaining segments of tie bar 42 may be used as a surface or limiter on which to place braces 101, or they may be entirely absent. An initial brace, such as brace 101B, may be lowered onto stand pipe 41 of interest. For example, if a central reference stand pipe 41 is known, brace 101B with multiple biasing hubs 120 may be placed on it first. Brace 101B may then be secured via its biasing hubs in a desired orientation of its connection hubs, or brace 101B may be left loose for future rotation.

Additional braces 101A may then be placed on desired stand pipes 41 for securing relative to brace 101B and connected with link bars to brace 101B. If the reference stand pipe and brace 101E thereon are locked, then the other stand pipes bearing additional braces 101A may be moved or held in a desired position by rotating braces 101A. Braces 101 may then be locked in place through biasing hubs, and link bars may also be crimped in place to further prevent relative motion. By virtue of the link bars and connection hubs, any desired positioning may be achieved through proper rotation of brace 101A with respect to brace 101B. For example, as shown in FIG. 6, right brace 101A has been rotated to reduce the distance from brace 101B, compared to left brace 101A and brace 101B. In this way, example embodiment systems may be adapted to any stand pipes 41 in any steam separator assembly and brace the same at customizable positions without the need for tie bars. Thus, example embodiment system 100 can be adapted to even separator assemblies with differing or irregular geometries among stand pipes 41.

Example embodiment system 100 may be fabricated of resilient materials that are compatible with a nuclear reactor environment, without substantially changing in physical properties, such as becoming substantially radioactive, melting, embrittlement, and/or retaining/adsorbing radioactive particulates. For example, several known structural materials, including austenitic stainless steels 304 or 316 and martensitic stainless steels 9Cr-1Mo and 2.25Cr-1Mo, XM-19, zirconium alloys, nickel alloys, Alloy 600, etc., as well as flexible and strong organic materials like hard plastics, resilient rubber, etc. may be chosen for any element of components of example embodiment steam generators. Joining structures and directly-touching elements may be chosen of different and compatible materials to prevent fouling.

Example embodiments and methods thus being described, it will be appreciated by one skilled in the art that example embodiments may be varied and substituted through routine experimentation while still falling within the scope of the following claims. For example, any number of different stand pipes can be braced by a single example embodiment system, and example embodiment systems can be used in several different types of reactor designs, simply through proper dimensioning of example embodiments. Such variations are not to be regarded as departure from the scope of these claims.

What is claimed is:

1. A system for supplementing a coolant separator assembly having a first stand pipe and a second stand pipe for receiving and separating liquid and vapor coolant flow, the system comprising:
a first brace configured to tighten around an outer perimeter of the first stand pipe;
a second brace configured to tighten around an outer perimeter of the second stand pipe; and
a link configured to mate at a first end with the first brace and at a second end with the second brace, wherein the first end and the first brace while mated are shaped to allow rotation of the first brace on a longest central axis of the first stand pipe.

2. The system of claim 1, wherein the first brace includes a first connection hub configured to mate with the first end of the link so that the link is rotatable about the first end, and wherein the second brace includes a second connection hub configured to mate with the second end of the link so that the link is rotatable about the first end.

3. The system of claim 2, wherein the first end of the link includes a first crimp post, and wherein the second end of the link includes a second crimp post, and wherein the first connection hub includes a first threaded opening, and wherein the second connection hub includes a second threaded opening.

4. The system of claim 3, further comprising:
a first crimp nut shaped to pass around the first crimp post and having threads shaped to mesh with the first threaded opening; and
a second crimp nut shaped to pass around the second crimp post and having threads shaped to mesh with the second threaded opening.

5. The system of claim 1, where the first brace and the second brace each include a biasing hub configured to move inward toward respective stand pipes.

6. The system of claim 1, wherein the first brace includes a plurality of biasing hubs positioned about an interior surface of the first brace, wherein each of the biasing hubs includes a wedge configured to bias perpendicular to a direction the wedge is drawn.

7. The system of claim 6, wherein the plurality of biasing wedges each include a crimp nut configured to lock the biasing wedge in a position when deformed.

8. The system of claim 1, wherein the first brace and the second brace are substantially circular and each include a plurality of drives that both secure the link bar to the first brace and the second brace and secure the first brace and the second brace to the first stand pipe and the second stand pipe, wherein the drives are all accessible from a same direction.

9. The system of claim 8, wherein the drives include a first crimp nut configured to rotate down onto the link bar and a second crimp nut configured to rotate down onto a wedge that biases against one of the first and the second stand pipes.

10. A system for supplementing a coolant separator assembly having a plurality of stand pipes for receiving and separating liquid and vapor coolant flow, wherein the system comprises:
a first brace configured to clamp to a first of the plurality of stand pipes;
a second brace configured to clamp to a second of the plurality of stand pipes;
a third brace configured to clamp to a third of the plurality of stand pipes;
a first link configured to connect the first brace and the second brace by nesting into holes of the first brace and the second brace from a top plane; and
a second link configured to connect the first brace and the third brace by nesting into holes of the first brace and the third brace from the top plane, wherein the first link is configured to connect to the second brace such that the second brace is selectively rotatable about the first link, and wherein the second link is configured to connect to the third brace such that the third brace is selectively rotatable about the second link.

11. The system of claim 10, wherein the first brace, the second brace, and the third brace are all configured to be clamped through a top plane.

12. The system of claim 11, wherein the first brace, the second brace, and the third brace are all configured to be clamped by a biasing wedge being driven downward from the top plane.

13. The system of claim 12, further comprising:
a plurality of crimp nuts configured to lock the biasing wedge and the first link and the second link from the top plane.

14. The system of claim 13, wherein each of the plurality of crimp nuts includes a threaded surface, and wherein each of the biasing wedge and the first brace, the second brace, and the third brace include matching threads so that the crimp nuts may be tightened into the matching threads.

15. The system of claim 10, wherein the first brace, the second brace, and the third brace are substantially circular and are the same shape.

16. A method of supplementing a coolant separator assembly having a first stand pipe and a second stand pipe for receiving and separating liquid and vapor coolant flow, the method comprising:
installing a first brace about the first stand pipe by lowering the first brace around the first stand pipe in a vertical direction;
installing a second brace about the second stand pipe by lowering the second brace around the second stand pipe in the vertical direction;
rigidly securing the first brace to the first stand pipe;
connecting a link bar between the first brace and the second brace; and
rotating the second brace on a longest central axis of the second stand pipe after the link bar is connected.

17. The method of claim 16, further comprising:
rigidly securing all of the second brace and the link bar.

18. The method of claim 16, wherein the rigidly securing includes tightening at least one nut about an axis in the vertical direction, and wherein the connecting the link bar includes tightening at least one other nut about another axis in the vertical direction.

19. The method of claim 16, further comprising:
removing at least a portion of a tie rod between the first stand pipe and the second stand pipe.

* * * * *